A. POUCHAIN.
NEGATIVE PLATE FOR ELECTRIC ACCUMULATORS.
APPLICATION FILED JUNE 22, 1920.

1,366,490.

Patented Jan. 25, 1921.

Inventor:
Adolfo Pouchain
By Lawrence Langner
Attorney.

UNITED STATES PATENT OFFICE.

ADOLFO POUCHAIN, OF TURIN, ITALY.

NEGATIVE PLATE FOR ELECTRIC ACCUMULATORS.

1,366,490.     Specification of Letters Patent.     Patented Jan. 25, 1921.

Application filed June 22, 1920. Serial No. 390,915.

*To all whom it may concern:*

Be it known that I, ADOLFO POUCHAIN, a subject of the King of Italy, and resident of Turin, Italy, have invented certain new and useful Improvements in Negative Plates for Electric Accumulators, of which the following is a specification.

This invention relates to a zinc negative plate for electric accumulators consisting in a zinc plate reinforced by a metal of high electrical conductivity and having a surface which is not attacked by the electrolyte when the circuit is closed. The reinforcement may consist of bands or threads fixed to or laced on the plate. The bands or threads are preferably of silver or of another metal which is a good conductor and has a silvered surface.

In the accompanying drawing are shown in perspective view two forms of plates made according to the invention.

Figure 1:
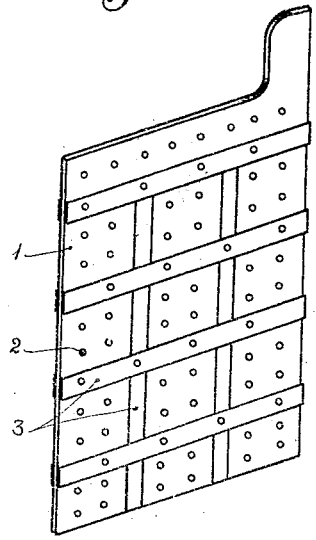

In Figure 1 the zinc plate 1, preferably having small perforations 2, has on each face thin bands 3 of silver, for example, which extend along the plate both transversely and longitudinally. These bands may be fixed to the plate in any suitable manner, for instance by rivets extending through perforations 2.

Figure 2:
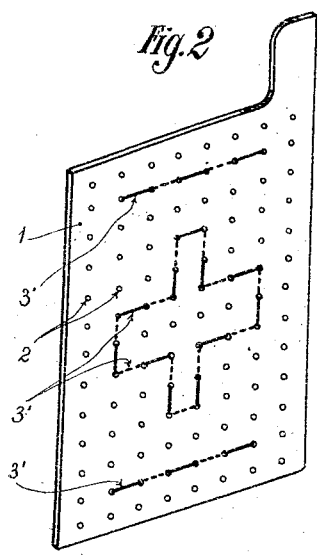

In the form shown in Fig. 2 the plate is traversed by one or more threads 3', of silver for example, which are laced in the plate through the perforations 2.

The bands 3 or threads 3' may be arranged in any desired manner relatively to the plate and the several bands or threads may be in contact with each other or independent and in electrical communication or not with the current lead.

Said bands 3 may also form a frame in which the zinc plate is carried.

The essential point is that different zones of the plate should be connected among themselves by an electric reinforcement of metal which is a good conductor and on this account favors uniform distribution of the electric actions on the plate.

It has been shown that with plates of this type the deposition of zinc during the charging and the erosion of the deposit during the discharge are much more uniform and regular than is the case with ordinary plates, and further that when the discharge is forced to such a degree that erosion of plate 1 begins, such erosion is distributed uniformly over the whole of the surface of the plate, for the presence of the electric reinforcement prevents or reduces local actions which could give rise to perforations of the plate, and in the most unfavorable conditions limits the extent of local erosion due to impurities in the zinc or in the electrolyte.

Plates of zinc reinforced in the manner prescribed by the invention have the advantage that they operate under normal conditions more regularly than ordinary plates so that they may be used without fear of perforations, which is advantageous as permitting discharge of the accumulator to be prolonged at the expense of the zinc from which the plate is formed.

Obviously the zinc plates should be amalgamated and in general treated by known methods to render the zinc incapable of attack by the electrolyte when the circuit is open.

What I claim as my invention and desire to secure by United States Letters Patent is:

1. A negative electrode for electric accumulators, comprising a solid zinc plate, and metallic pieces extending along both surfaces of said zinc plate, said pieces being of a metal of high electrical conductivity and the surface of which is unattacked by the electrolyte when the circuit is closed.

2. A negative electrode for electric accumulators, comprising a perforated zinc plate, and metallic pieces extending along both surfaces of said zinc plate and fixed to it by engaging the holes of the plate, said pieces being of a metal of high electrical conductivity and the surface of which is unattacked by the electrolyte when the circuit is closed.

3. A negative electrode for electric accumulators, comprising a solid zinc plate, and pieces of silver extending along both surfaces of said zinc plate.

4. A negative electrode for electric accumulators, comprising a solid zinc plate, and pieces of silvered metal extending along both surfaces of said zinc plate.

Signed at Turin, Italy, this 26th day of May, 1920.

ADOLFO POUCHAIN.